Patented Jan. 2, 1940

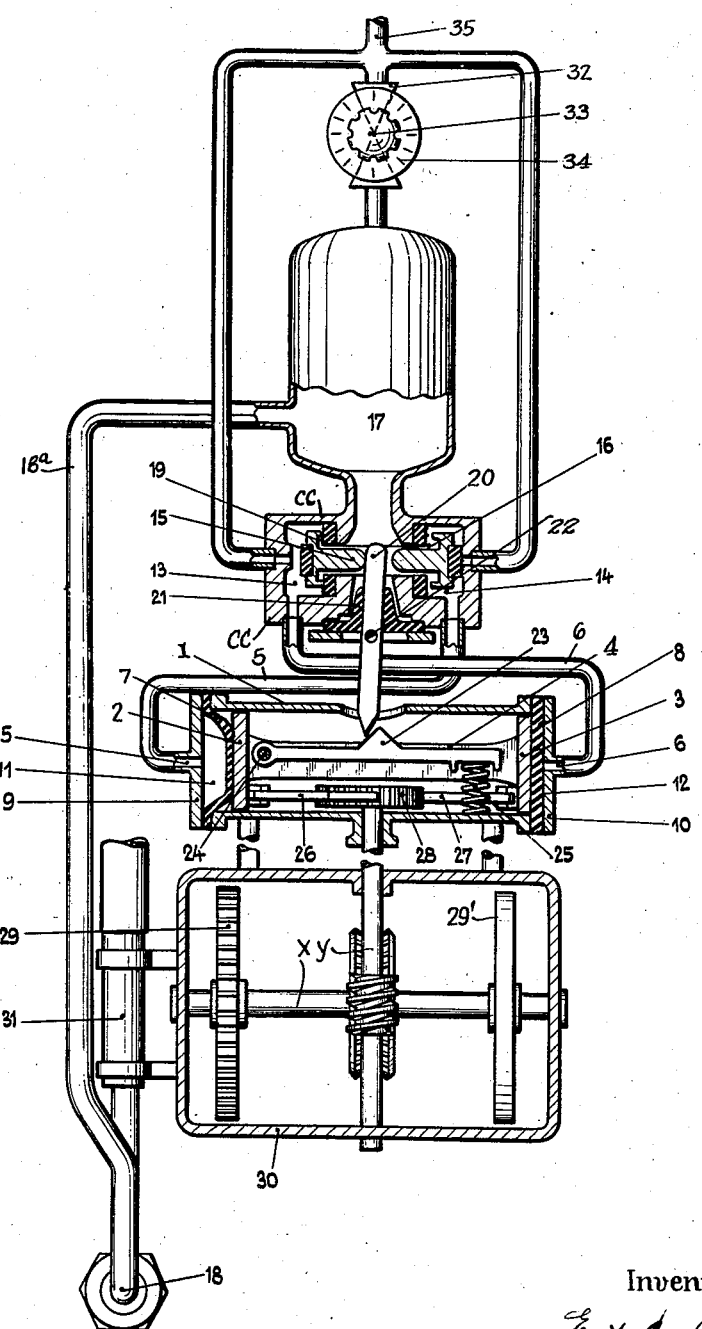

2,185,781

UNITED STATES PATENT OFFICE 2,185,781

SELF-ADVANCING AUTOGENOUS TORCH

Ernst Becker, Dusseldorf, Germany, assignor to firma Autogenwerk "Sirius" Gesellschaft mit beschränkter Haftung, Dusseldorf, Germany Application August 2, 1938, Serial No. 222,715
In Germany January 27, 1938

13 Claims. (Cl. 266—23)

Autogenous torches, including cutting and welding torches or the like, are of course broadly known. It is also a known expedient to provide such torches with mechanical means or devices for motivating or driving the same for the purpose of obtaining an uniform operative advance of the torch in relation to the work upon which it performs. Such means or devices have heretofore generally comprised or been actuated by an electric motor. The use of an electric motor however involves the necessary presence of a current source which is not always available at the place where the apparatus is to be utilized.

In order to circumvent this disadvantage it has previously been proposed to use as the motivating power the oxygen from a high pressure source which is invariably required for the cutting operation of the torch. Up to the present time, however, this proposal has not been brought into practical utilization, since the turbines which were used in such prior attempts to carry said principle into effect and performance were found to be unsuitable. In particular it may here be pointed out that it is not possible to adjust the quantity of oxygen used for driving the turbine in such a way that it will be completely consumed in a predetermined advance of the cut made by the torch, which of course, depends upon the thickness and the type of the material which is to be cut. Furthermore, it is necessary in practice to operate with an excess of oxygen, so that the driving of the turbines is inimicable to the economy of the cutting process.

According to the present invention the stated defect of the proposal (motivation by oxygen supply) is removed by using a driving motor in the form of a piston motor. Such a motor advantageously has two or more pistons. By this means it is possible to adjust and regulate the cylinder space, the quantity of oxygen and the speed of advance of the torch in such an accurate manner, corelatively, that the oxygen used for operating the piston motor can be passed on for utilization in the actual cutting operation, without any loss, and thus can be completely or finally consumed in the cutting operation.

Moreover, the advance of the torch can be so regulated in accordance with various thicknesses of material worked upon that with the cutting of thicker material, requiring a greater quantity of oxygen, a slower speed is obtained, and with the cutting of a thinner material, requiring less oxygen, a higher speed is obtained.

A practical embodiment of the invention is illustrated by way of example in the annexed drawing, which, however, it will be understood is illustrative only and meant to exemplify only one of various possible embodiments that might be used. In this drawing, the important driving and control parts are shown in section, while the connection conduits are shown mainly in elevation.

Referring to said drawing, I represents an operating cylinder in which move two pistons 2 and 3, these pistons being rigidly connected by the web 4. The said pistons 2 and 3 are sealed from the gas inlet pipes 5 and 6 at opposite ends by elastic diaphragms 7 and 8, which latter are clamped between the cylinder 1 and the opposite end covers 9 and 10 of the cylinder.

Instead of the two separate pistons 2 and 3, a single piston adapted to be operated upon at opposite sides can of course be employed. The two pistons each acted on at one side only however have the advantage that no plugs or glands which increase the friction and reduce the power are required.

Oxygen is fed through the aforenamed gas inlet pipes 5 and 6 into the two chambers 11 and 12 (formed between the diaphragms and the cylinder ends) communicating by connection with chambers 13 and 14 of a control cylinder CC. Said control cylinder has a double piston 15 reciprocably operable therein, which is so constructed that when it closes off the oxygen supply through the feed pipe 5 to the left hand chamber 11 of the operating cylinder, it simultaneously opens up an escape aperture 16 therearound so that oxygen in said pipe can flow backward from said chamber 11 into a gas or air chamber 17 connecting with said control cylinder, and from there (mingled with the direct oxygen supply) to the cutting nozzle 18 of the torch through the connection 18ª thereto. Conversely, when the double piston 15 closes off the oxygen supply through the feed pipe 6 to the right hand chamber 12 of the operating cylinder, it simultaneously opens up an escape aperture 19 therearound so that oxygen in the latter pipe can flow backward from said chamber 12 in the same way. The gas or air chamber 17 acts as a pressure balancing means in that it receives the charges or impulses of oxygen back-flowed alternately from the cylinder chambers 11 and 12 within its cushioning area and in turn releases or discharges the oxygen in a uniform stream to the cutting torch.

The double piston 15 is shown actuated by a rocking lever 20, one arm of which acts between opposite ends thereof and extends through the elastic diaphragm or gland 21 which seals the control cylinder and chamber 17 from the outer atmosphere. Said rocking lever 20 is pivoted at 22 close beneath or behind the sealing diaphragm in order to obtain as small a movement of this diaphragm as possible, since the smaller the movement of the diaphragm when the lever is moved, the smaller will be the resistance set up by friction and consequently the greater the stability. The other arm of said lever 20 is actuated by a wedge-shaped cam or projection 23 which is pivotally mounted at 24 on the web 4 of the operating cylinder pistons and is pressed as by the spring 25 in contact with the end or cam surface of said arm of the lever.

The reciprocating action or movement of the operating cylinder pistons 2 and 3, is translated into a rotary movement by means of a pair of pawls 26 and 27 and a ratched wheel 28 operating as an escapement. This rotary movement is transmitted as by means of a well-known worm and worm wheel device $xy$ to the gear wheel 29 of a frame or carriage 30, providing the vehicle mounting support for the cutting torch 31. Said gear wheel 29 and a counterpart wheel 29' or other wheels (not shown) driven thereby form part of the wheel support for the frame or carriage.

A regulating valve in connection with the oxygen supply is denoted at 32, this valve being operable or adjustable for example by a hand wheel 33 and serving to regulate the feed flow of the oxygen (from the supply source) according to the adjustment made with reference to a scale 34. The oxygen, which is introduced from the supply source (not shown) at 35, can pass or distribute in three ways, namely, direct through said valve 32 to the chamber 17 and in opposite directions around said chamber to opposite sides of the control cylinder, connecting to the latter's chambers 13 and 14. In all three ways however, it passes either directly or indirectly to the chamber 17 and thence to the nozzle 18 of the cutting torch so that in effect it flows to the torch in two different main paths.

The setting of the regulating valve 32 determines the quantities of oxygen which are allowed to pass through one or the other of these two main paths. If said regulating valve is closed, the whole of the oxygen will pass through the motor or control cylinder CC and thence into the air chamber 17 to the nozzle 18. Under these circumstances the motor will reach its maximum speed. On the other hand, the greater the extent to which the regulating valve is opened, the greater will be the amounts of oxygen circumventing the control cylinder CC and passing directly through the air chamber 17 to the nozzle 18. Consequently, the speed of the motor will be greatly reduced.

With the above described apparatus or its like, it is at any time possible to adjust the pressure and amount of the oxygen feed, the cutting intensity or power and the speed of advance in such a way that the oxygen will be completely utilized without any wastage. In this connection the adjustment of the pressure of the oxygen can be made by means of a pressure reducing valve (not shown) provided on the oxygen container. The quantity of the oxygen used may also, for example, be regulated by inserting a suitable nozzle (not shown) in the cutting torch. The cutting intensity or power may be adjusted for example by means of the aforementioned hand wheel 33 on the regulating valve 32. To this end the oxygen pressure and the properly appurtenant or corelated nozzle sizes calculated for various thickness of metal might be indicated on the scale 34.

Having thus described my invention, what I claim as new and desire to secure by Letters Patent of the United States is:

1. Apparatus for effecting the automatic advance of autogenous cutting torches adapted to be actuated by the oxygen used for the cutting operation, including a motor comprising at least one piston, wherein an air chamber is arranged between the motor and the cutting nozzle, through which air chamber the oxygen from the motor is arranged to flow before reaching the said nozzle.

2. Apparatus for effecting the automatic advance of autogenous cutting torches adapted to be actuated by the oxygen used for the cutting operation, including a motor comprising at least one piston, wherein an air chamber is arranged between the motor and the cutting nozzle, through which air chamber the oxygen from the motor is arranged to flow before reaching the said nozzle, whereby the main oxygen feed pipe communicates directly with said air chamber through a regulating valve by means of which the relation between the quantity of oxygen passed directly into said air chamber and the quantity of oxygen by passing said chamber and entering the motor first can be varied.

3. Apparatus according to claim 2, wherein the regulating valve is provided with manual adjusting means and with a scale bearing indications of the optimum speeds of advance of the nozzle corresponding to various thicknesses of material to be cut.

4. A mechanism for self-propelling or advancing a tool operable by the use of a gas in relation to the work upon which it performs, comprising, in combination with a carriage on which the tool is mounted, a piston motor also mounted on said carriage and operable by a pressure action of the gas supplied thereto before its supply to the tool from a connected supply source, the said gas supplied to said piston motor being therefrom exhausted to the tool and the operation of the motor being translated into rotary motion imparted to wheels on which said carriage is supported.

5. A mechanism for self-propelling or advancing a tool operable by the use of a gas in relation to the work upon which it performs, comprising, in combination with a carriage on which the tool is mounted, a piston motor adapted to drive the wheels of said carriage by the translation of a reciprocatory movement into rotary movement applied to said wheels, said piston motor being operable by pressure of gas alternately applied to opposite ends thereof and the gas so used in operating the motor being the same as the gas used in operation of the tool.

6. A mechanism for self-propelling or advancing a tool operable by the use of a gas in relation to the work upon which it performs, comprising, in combination with a carriage on which the tool is mounted, a piston motor adapted to drive the wheels of said carriage by the translation of a reciprocatory movement into rotary movement applied to said wheels, said piston motor being operable by pressure of gas alternately applied to opposite ends thereof and the gas so applied being the same as and being supplied from the same source as the gas supplied to the operation of the tool, such gas being in part diverted in its feed to the tool to a feed to said motor and being from said motor exhausted to utilization by the tool.

7. A mechanism for self-propelling or advancing a tool operable by the use of a gas in relation to the work upon which it performs, comprising, in combination with a carriage on which the tool is mounted, a piston motor adapted to drive the wheels of said carriage by the translation of a reciprocatory movement into rotary movement applied to said wheels, said piston motor being operable by pressure of gas alternately applied to opposite ends thereof and the gas so applied being the same as and being supplied from the same source as the gas supplied to the operation of the tool, such gas being in part diverted in its feed to the tool to a feed to said motor and being from said motor exhausted to utilization by the tool and means for alternately applying such diverted gas to the opposite ends of the piston motor.

8. An apparatus for self-propelling or moving an autogenous torch or the like tool operable by the use of a gas in operable relation to the work on which the same performs, comprising, in combination with said torch and means supplying the gas thereto from a supply source, a carriage on which the torch is mounted, a driving motor comprising a cylinder having a piston reciprocable therein and actuated by the pressure of gas applied to opposite ends of the same, connections at opposite ends of said cylinder for introducing gas under pressure thereto from the gas supply source, a control member comprising a second cylinder having a reciprocable piston element therein serving to oppositely and alternately open and close corresponding two-way ports in opposite ends of said second cylinder, connections at opposite ends of said second cylinder for introducing gas thereinto from the said supply source, the said connections having communication with one of the two-way ports in said ends of the cylinder opened and closed by said piston element, means communicating with the other of said two-way ports opened and closed by said piston element in the ends of said second cylinder and connected with the gas connection between the torch and said gas supply source, means operating the piston element of the secondnamed cylinder by operation of the piston of the firstnamed cylinder, conduit connections between the two-way port sections of said secondnamed cylinder and the gas introductory connections of the firstnamed cylinder, and means translating the reciprocable action of the piston of the firstnamed cylinder into rotary motion and transmitting said rotary motion in drive to the wheels of the carriage.

9. Means for self-propelling or advancing an autogenous torch or the like tool operable by the use of a gas in operative relation to the work on which the same performs, comprising, in combination with said torch and means supplying the same with the gas from a supply source, a carriage on which the torch is mounted, a driving motor comprising a cylinder having a reciprocable piston therein actuated by the pressure of gas applied to opposite ends of the same, connections at opposite ends of said cylinder for introducing gas under pressure thereinto supplied from the gas supply source, a control member comprising a second cylinder having a reciprocable piston element therein serving to oppositely and alternately open and close corresponding two-way ports in opposite ends of said second cylinder, connections at opposite ends of said second cylinder for introducing gas thereinto from the said supply source, the said connections having communication with one of the two-way ports in said ends of the cylinder opened and closed by said piston element, means communicating at one end with the other of said two-way ports opened and closed by said piston element in the ends of said second cylinder and at the opposite end with the gas connection between the torch and said gas supply source, means reversely operating the piston element of the secondnamed cylinder by operation of the piston of the firstnamed cylinder, conduit connections reversely connecting the two-way port sections at opposite ends of the secondnamed cylinder with the gas introductory connections at the ends of the firstnamed cylinder and means translating the reciprocable action of the piston of the firstnamed cylinder into rotary motion and transmitting said rotary motion in drive to the wheels of the carriage.

10. Means for self-propelling or advancing an autogenous torch or the like operable through the media of a gas in operative relation to the work on which the same performs, comprising, in combination with said torch and means supplying the same with the gas from a supply source, a wheel-supported carriage on which the torch is mounted, a driving motor comprising a cylinder having a piston element working therein in opposite directions, connections at opposite ends of said cylinder for introducing gas thereinto, a control member comprising a second cylinder having a double-acting piston element working therein to oppositely open and close two-way ports in its ends thereof, connections at opposite ends of said second or control cylinder for introducing gas thereinto from the supply source, the said connections having communication with one of the two-way ports of the control cylinder and being closed by said double-acting piston in opposite positions of its movement, a gas chamber having an introductory valve-controlled connection with the gas supply source and an open connection with said control cylinder, the said open connection thereof communicating with the other of said two-way ports and being likewise closed by the double-acting piston in opposite positions of movement, connections between the two-way port sections of said second or control cylinder and the opposite end gas introducing connections of the firstnamed or motor cylinder, means operating to its opposite positions of movement the double-acting piston of the second cylinder from the operation of the piston of the firstnamed cylinder by force of gas introduced into the opposite ends of the latter, means translating the reciprocal movement of the lastnamed piston into rotary movement and transmitting said rotary movement to the wheels of the aforesaid carriage, and a gas feed connection between said gas chamber and the inlet of the torch.

11. A self-propelling or advancing mechanism for a tool operable by the use of a gas, comprising in combination with the tool and means supplying the gas thereto from a supply source, a carriage on which the tool is mounted, a driving motor comprising a cylinder having a piston working therein in opposite directions, connections at opposite ends of said cylinder for introducing gas thereinto, a control member comprising a second cylinder having a double-acting piston element therein working to oppositely open and close two-way ports in the ends thereof, connections at opposite ends of said second or control cylinder for introducing gas thereinto from the supply source, the said connections having communication with one of the two-way ports at the ends of said cylinder and being closed by said double-acting piston element in opposite positions of its movement, a gas chamber having an introductory valve-controlled connection with the gas supply source and an open connection with said control cylinder, the said open connection thereof communicating with the other of said two-way ports in the cylinder ends likewise closed by the double-acting piston in opposite positions of movement, connections between the two-way port sections of said second or control cylinder and the opposite end gas introductory connections of the firstnamed or motor cylinder, means operating to its opposite positions of movement the piston element of the second cylinder from the operation of the piston of the firstnamed cylinder by force of the gas introduced into the opposite ends of the latter, means translating the opposite working or reciprocal movement of the lastnamed piston into rotary movement and transmitting said rotary movement in drive to the wheels of the aforesaid carriage, and a gas feed connection between said gas chamber and the gas introduction point of the tool.

12. An apparatus according to claim 8, wherein flexible diaphragms are interposed between the ends of the piston and the ends of the cylinder of said driving motor member, so as to seal the chambers formed between the two said elements against gas leakage around the piston.

13. An apparatus according to claim 8, wherein the means operating the piston element of the secondnamed cylinder by operation of the piston of the firstnamed cylinder comprises a rocking lever pivoted close to the outer wall of said secondnamed cylinder and having one end extending therethrough between opposite portions of the piston element therein, its other end being extended through the wall of the firstnamed cylinder into oscillatable contact with a cam carried by the piston of the latter, and an elastic diaphragm or gland engaging around said arm of the lever extending into said secondnamed cylinder to seal the cylinder against gas leakage to the atmosphere.

ERNST BECKER.